(12) United States Patent
Stevens

(10) Patent No.: US 7,597,256 B2
(45) Date of Patent: Oct. 6, 2009

(54) HIGH SECURITY WIRELESS KEY FOR ASYNCHRONOUS DELIVERY DROP BOXES

(75) Inventor: John K. Stevens, Stratham, NH (US)

(73) Assignee: Visible Assets, Inc, Mississauga, Ontario (CA)

( * ) Notice: Subject to any disclaimer, the term of this patent is extended or adjusted under 35 U.S.C. 154(b) by 194 days.

(21) Appl. No.: 11/276,506

(22) Filed: Mar. 2, 2006

(65) Prior Publication Data

US 2007/0205273 A1 Sep. 6, 2007

Related U.S. Application Data

(62) Division of application No. 10/415,502, filed as application No. PCT/US01/26840 on Aug. 28, 2001, now Pat. No. 7,028,339.

(60) Provisional application No. 60/228,555, filed on Aug. 28, 2000.

(51) Int. Cl.
*G06K 15/00* (2006.01)
*G06Q 30/00* (2006.01)
*G06F 17/00* (2006.01)
*A47G 29/12* (2006.01)
*G08B 13/14* (2006.01)

(52) U.S. Cl. .................. 235/383; 705/26; 705/500; 232/19; 340/569

(58) Field of Classification Search .................. 235/383
See application file for complete search history.

(56) References Cited

U.S. PATENT DOCUMENTS

| | | | |
|---|---|---|---|
| 4,795,424 A | 1/1989 | Burner | |
| 5,491,807 A | 2/1996 | Freeman | |
| 5,599,099 A | 2/1997 | Bullivant | |
| 5,774,053 A * | 6/1998 | Porter | 340/568.1 |
| 5,802,859 A | 9/1998 | Zugibe | |
| 5,942,985 A | 8/1999 | Chin | |
| 5,960,411 A * | 9/1999 | Hartman et al. | 705/26 |
| 5,966,663 A | 10/1999 | Gleason | |
| 5,979,750 A * | 11/1999 | Kindell | 232/19 |
| 5,991,749 A | 11/1999 | Morrill, Jr. | |
| 6,246,998 B1 * | 6/2001 | Matsumori | 705/27 |
| 6,323,782 B1 | 11/2001 | Stephens et al. | |
| 7,136,830 B1 * | 11/2006 | Kuelbs et al. | 705/27 |
| 2004/0010706 A1 | 1/2004 | Stevens | |

FOREIGN PATENT DOCUMENTS

WO     WO 02/19092     3/2002

* cited by examiner

*Primary Examiner*—Daniel Walsh
*Assistant Examiner*—Tae W Kim
(74) *Attorney, Agent, or Firm*—Larson & Anderson, LLC

(57) ABSTRACT

A wireless key (6), capable of transmitting an ultra-low frequency radio wave signal (5), is used to gain access to a secure receptacle (1), the wireless key (6) and receptacle (1) comprising a system to ensure the secure transfer or delivery of items between parties typically engaging in e-commerce. The wireless key (6) possesses a means to discriminate against the unauthorized entry of the receptacle, such as through the use of buttons to enter a secure access code. The wireless key (6) accepts an access code entry from the user desiring entry to the receptacle (1) and subsequently transmits an ultra-low frequency signal (5) to a receiving and processing means (4). If the analysis of the signal indicates the user of the wireless key (6) is authorized to gain entry to the receptacle (1), the receptacle's locking mechanism (3) is disengaged to allow entry.

8 Claims, 5 Drawing Sheets

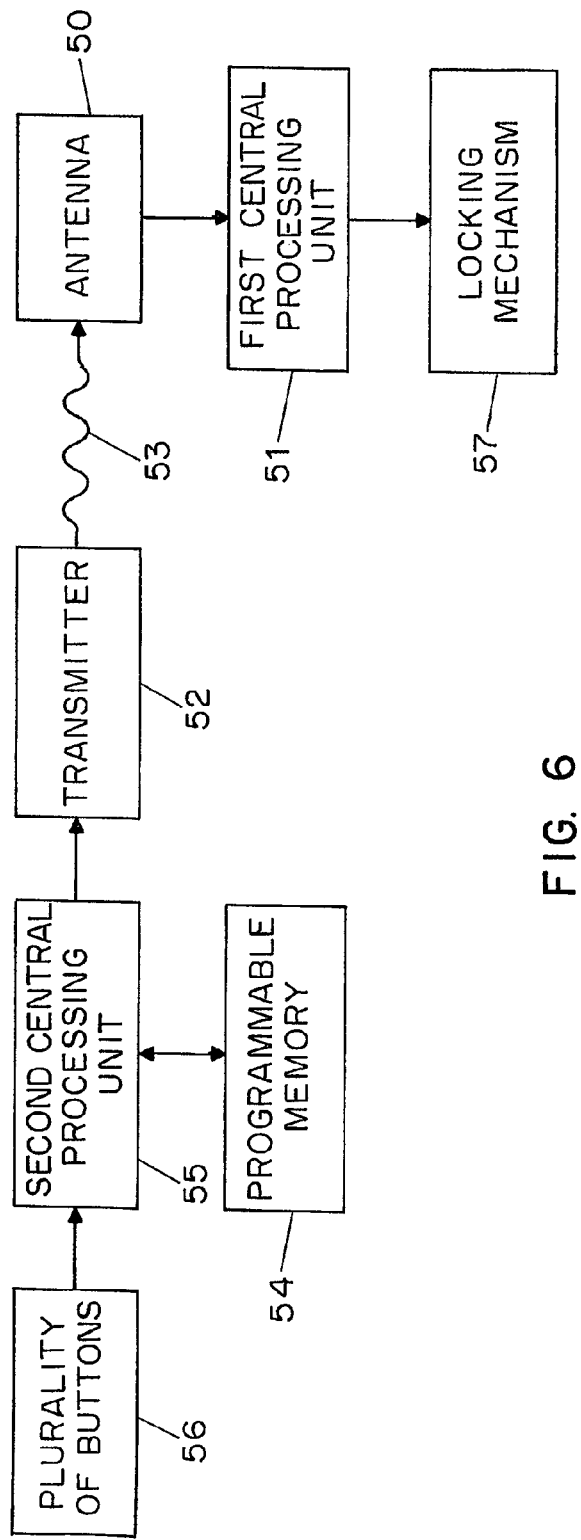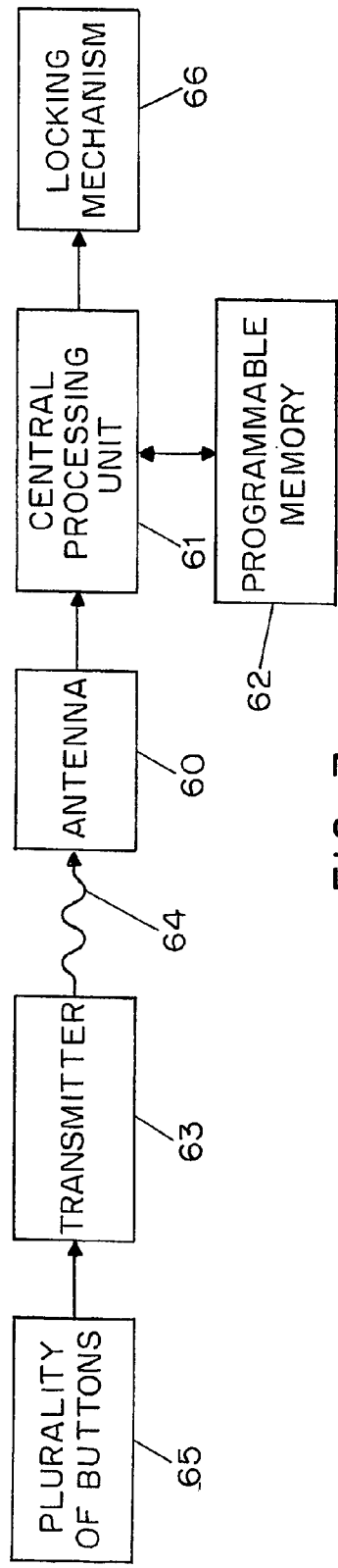
FIG. 6
FIG. 7

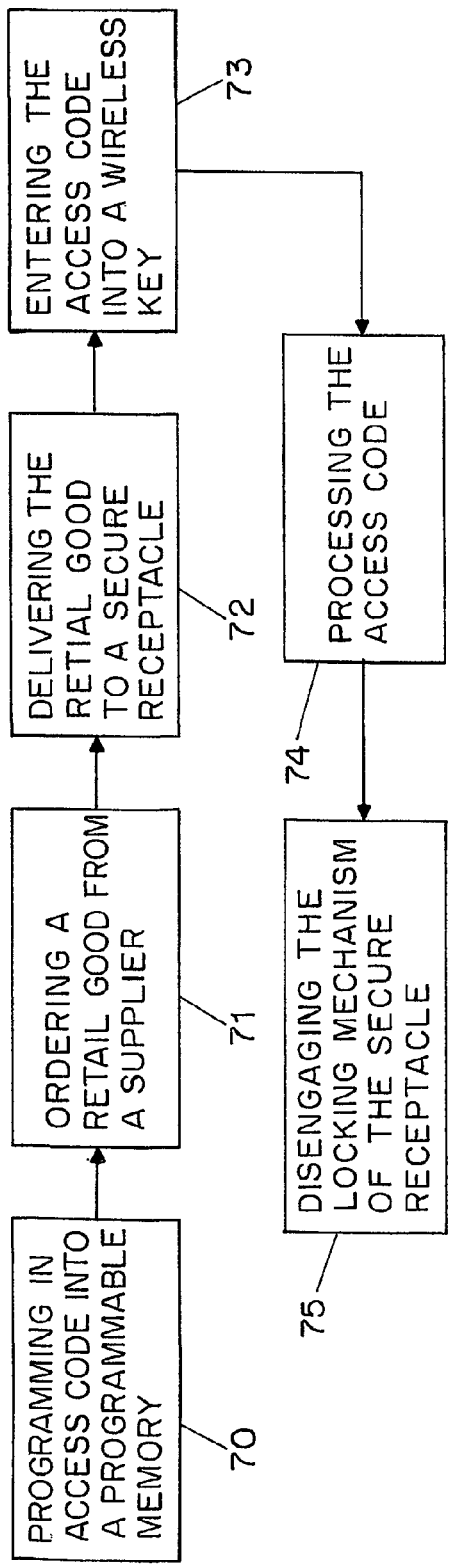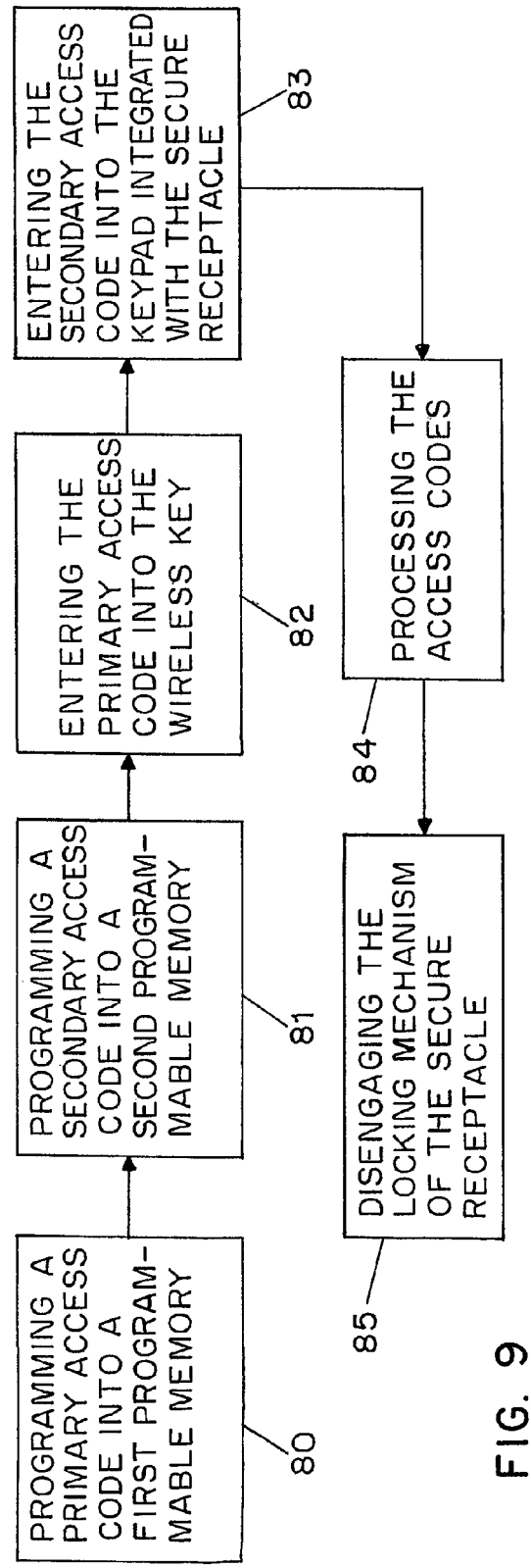

HIGH SECURITY WIRELESS KEY FOR ASYNCHRONOUS DELIVERY DROP BOXES

CROSS REFERENCE TO RELATED APPLICATION

This application claims priority from U.S. application Ser. No. 10/415,502 filed Apr. 28, 2003, which is a Section 371 national phase of PCT/US01/26840 filed Aug. 28, 2001, which is a non-provisional of U.S. application No. 60/228,555 filed Aug. 28, 2000, all of which are incorporated herein by reference for all purposes.

BACKGROUND OF THE INVENTION

The present invention relates to the secure transfer of retail goods between a delivery carrier and a consumer. With the advent of e-commerce, a consumer can order a retail good through the Internet or other telecommunications means and the delivery carrier must make a delivery to the consumer and at a time that is potentially inconvenient for the consumer to receive the order. To deliver the retail goods to the consumer, the parties will make use of a secure drop box or receptacle that possesses a lock to prevent unauthorized parties, such as thieves, from accessing the drop box.

Currently, many secure receptacles employ a keypad which is physically integrated with the secure receptacle. When a delivery carrier or consumer desires to gain access to the secure receptacle, an access code is entered using the keypad. Keypads thus provide some level of security, but the access code may be compromised through either the direct observation of an authorized party entering the code, or by determining which keys have been previously depressed by inspecting the keys of the keypad.

Therefore, there is a need to increase the means by which security of drop boxes can be increased to ensure the delivery of retail goods to a consumer.

SUMMARY OF THE INVENTION

The present invention is directed towards a system for the delivery of retail goods to a secure receptacle. A wireless key transmitting an access code allows entry to the secure receptacle upon the successful processing of the access code and the subsequent disengagement of the secure receptacle's locking mechanism.

DESCRIPTION OF THE DRAWINGS

FIG. 6 shows a wireless key in which the programmable memory and central processing unit of the wireless key determine whether the access code is authorized before a signal is transmitted to the antenna that is physically integrated with a secure receptacle.

FIG. 7 shows a wireless key in which unlocking signals are sent to the secure receptacle and the central processing unit and programmable memory integrated with the secure receptacle determine whether the access code entered into the wireless key is authorized.

FIG. 8 shows the process associated with the use of a wireless key, one access code, and a secure receptacle in the secure delivery of retail goods.

FIG. 9 shows the process associated with the use of a wireless key, a keypad, two access codes, and a secure receptacle in the secure delivery of retail goods.

DETAILED DESCRIPTION OF THE INVENTION

The present invention is directed to a system that uses a wireless key and a secure receptacle in the transfer of retail goods between a consumer and a delivery carrier. The system, through the use of the wireless key, possesses several means to discriminate against those parties who are not authorized to use the wireless key for gaining access to the secure receptacle.

A retail good in the present invention comprises any good or service that a consumer can purchase remotely from a supplier, such as through the Internet or over the telephone, and involves the delivery or pickup of a tangible item. Such retail goods, for example, include perishable and packaged dry goods, pharmaceutical prescriptions, and beverages. In addition, retail goods include items associated with convenience services. For example, movie rentals and the dry cleaning of clothing are retail goods as envisioned in this invention, although such "products" are closely related to the performance of a service. The present invention contemplates a retail good as anything which can be delivered and picked up at a consumer's residence by a delivery carrier and stored in a secure receptacle. Thus, the present invention contemplates the transfer of retail goods, which includes not only the delivery of items, but also the pickup of items.

The secure receptacle is designed to safely guard retail goods between the times that the retail goods are transferred between the user of the secure receptacle, the consumer, and the delivery carrier for the supplier. In order for a delivery carrier to access the secure receptacle to either pickup or deliver a retail good, the secure receptacle must be located in a place that is accessible to the rest of the public. Thus, to protect against thieves and other unauthorized persons, two variables must be addressed in securing the receptacle: securing the interior so that the contents of the receptacle remain safe, and securing the receptacle itself so as to minimize the risk of the theft of the receptacle itself.

Figure 1:
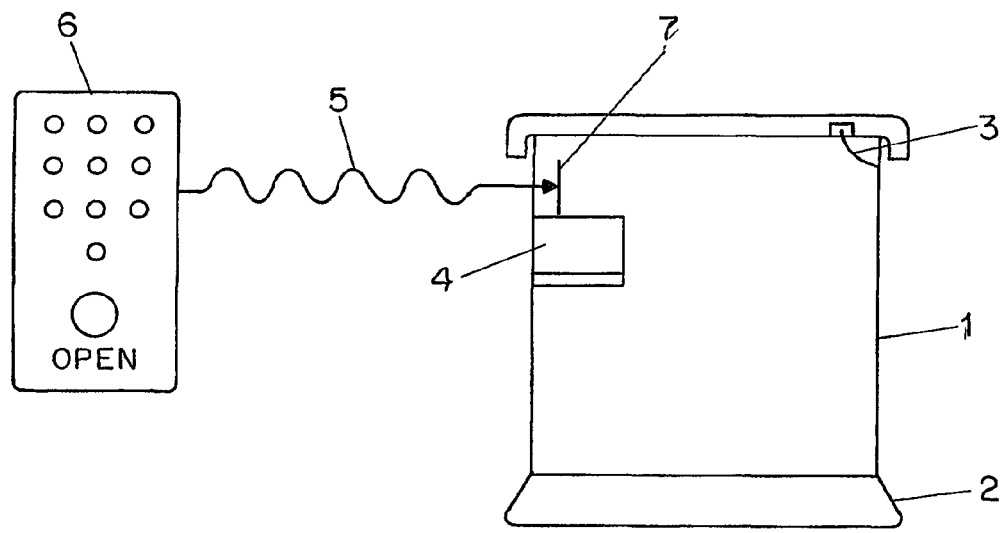
FIG. 1 shows the wireless key transmitting an unlocking signal to the antenna cooperatively positioned within the secure receptacle.

Securing the receptacle itself may be accomplished by many means, such as attaching the receptacle to the exterior side of a house or bolting the bottom of the interior to the ground. However, the preferred embodiment of the invention is to secure the bottom of the secure receptacle (1) to a separate platform base (2), as shown in FIG. 1, that has a large weight, such as 120 pounds. A platform base of this mass allows the receptacle to be moved relatively easy, yet provides a deterrent to theft.

The receptacle possesses a locking mechanism (3), as shown in FIG. 1, coupled with a central processing unit to prevent unauthorized access to the contents of the receptacle. The locking mechanism is disengaged by the central processing unit (4) only if an unlocking signal (5) is transmitted from the wireless key (6) and ultimately received by the antenna (7) and processed as acceptable by the central processing unit (4).

The unlocking signal in the preferred embodiment comprises an ultra-low frequency radio wave.

Figure 2:
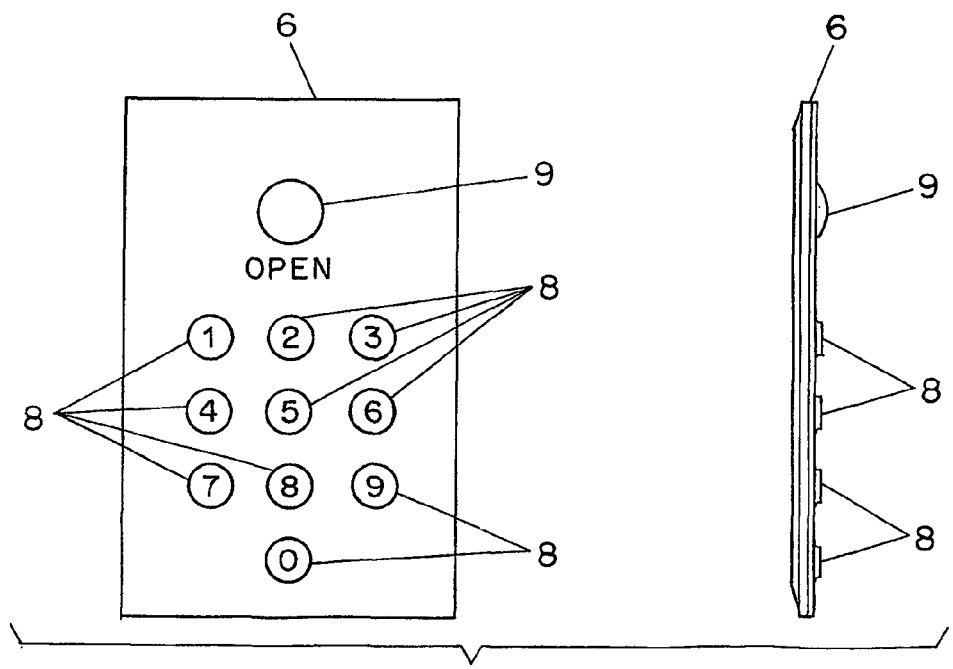
FIG. 2 shows one embodiment of the wireless key.

Those skilled in the art will recognize that many different electronic embodiments are possible to produce a device that comprises a wireless key. One embodiment of the invention, as shown in FIG. 2, contemplates a wireless key (6) that possesses ten buttons (8) and is conveniently shaped to be about the size of a credit card. The wireless key furthermore possesses a central processing unit that controls the transmission of the unlocking signal, and a programmable memory for storing the access code known by a party authorized to use the wireless key. Upon the entry of an access code, the central processing unit compares the entry to that stored in the first programmable memory. If the entered access code correctly matches the access code stored in the memory, an unlocking signal will be transmitted by the wireless key when the user of the wireless key presses an "OPEN" button (9).

The following examples further illustrate, without limitation, how a wireless key can be used with a secure receptacle.

EXAMPLE 1

Figure 3:
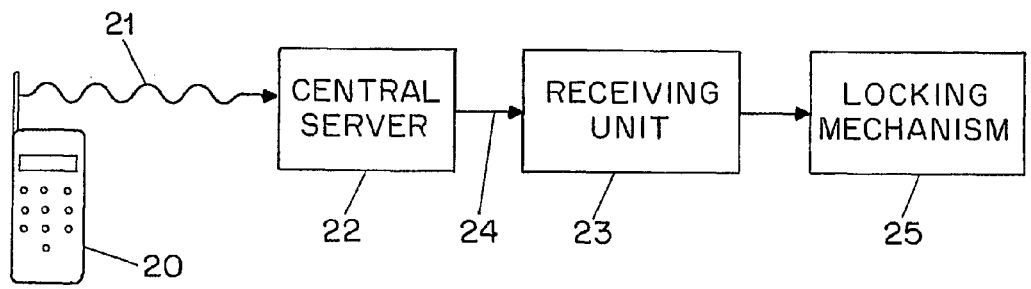
FIG. 3 shows a cellular telephone acting as a wireless key through a geographically distanced central server.

In one embodiment of a system for the secure delivery of a retail good, as shown in FIG. 3, a wireless key comprising a cellular telephone (20) and possessing a plurality of buttons to enter an access code transmits a first unlocking signal (21) to a geographically distant central server (22), the wireless key being physically separate from a secure receptacle and typically stored in locations inaccessible to unauthorized users of the secure receptacle. A receiving unit (23), comprising a central processing unit communicatively connected to a programmable memory, is cooperatively positioned within the secure receptacle and communicatively connected to the geographically distant central server (22). The receiving unit receives a second unlocking signal (24) from the geographically distant central server. The central processing unit of the receiving unit (23) processes the second unlocking signal (24), whereupon a locking mechanism (25) for the secure receptacle is disengaged thereby allowing entry to the secure receptacle.

EXAMPLE 2

Figure 4:
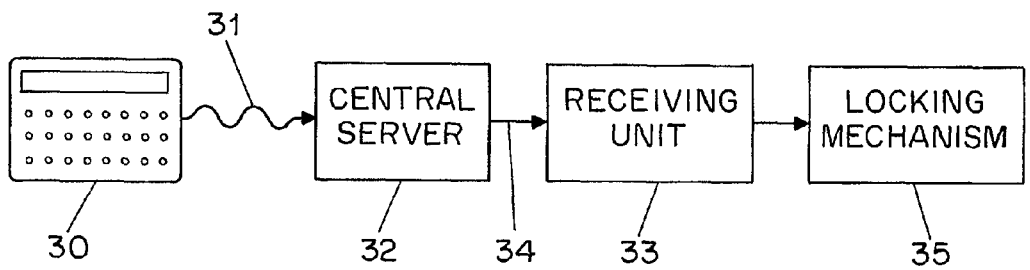
FIG. 4 shows a two-way pager acting as a wireless key through a geographically distanced central server.

In one embodiment of a system for the secure delivery of a retail good, as shown in FIG. 4, a wireless key comprising a two-way pager (30) and possessing a plurality of buttons to enter an access code transmits a first unlocking signal (31) to a geographically distant central server (32), the wireless key being physically separate from a secure receptacle and typically stored in locations inaccessible to unauthorized users of the secure receptacle. A receiving unit (33), comprising a central processing unit communicatively connected to a programmable memory, is cooperatively positioned within the secure receptacle and communicatively connected to the geographically distant central server (32). The receiving unit receives a second unlocking signal (34) from the geographically distant central server. The central processing unit of the receiving unit (33) processes the second unlocking signal (34), whereupon a locking mechanism (35) for the secure receptacle is disengaged thereby allowing entry to the secure receptacle.

EXAMPLE 3

Figure 5:
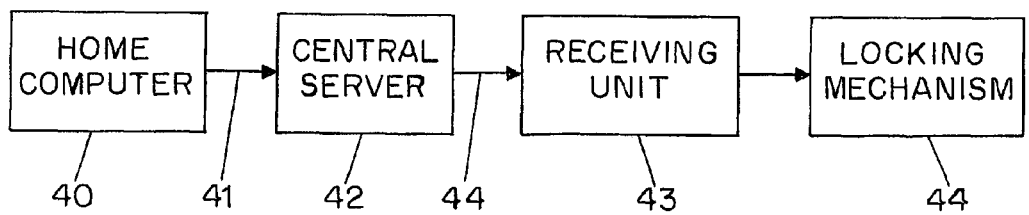
FIG. 5 shows a home computer acting as a wireless key through a geographically distanced central server.

In one embodiment of a system for the secure delivery of a retail good, as shown in FIG. 5, a wireless key comprising a home computer with a modem (40) transmits a first unlocking signal (41) to a geographically distant central server (42), the wireless key being physically separate from a secure receptacle and typically stored in locations inaccessible to unauthorized users of the secure receptacle. A receiving unit (43), comprising a central processing unit communicatively connected to a programmable memory, is cooperatively positioned within the secure receptacle and communicatively connected to the geographically distant central server (42). The receiving unit receives a second unlocking signal (44) from the geographically distant central server. The central processing unit of the receiving unit (43) processes the second unlocking signal (44), whereupon a locking mechanism (45) for the secure receptacle is disengaged thereby allowing entry to the secure receptacle.

EXAMPLE 4

In a further embodiment of the invention, as shown in FIG. 6, a receiving unit comprises an antenna (50) and a first central processing unit (51). The receiving unit is cooperatively positioned within a secure receptacle, the first central processing unit (51) communicatively connected to the antenna (50), and the antenna communicatively connected to a transmitter of a wireless key (52) via a wireless link (53). The wireless key comprises a programmable memory (54), a second central processing unit (55), and a transmitter (52), the wireless key being physically separate from the secure receptacle and typically stored in locations inaccessible to unauthorized users of the secure receptacle. The wireless key further possesses a plurality of buttons (56), the plurality of buttons being used to enter an access code. The second central processing unit (55) of the wireless key proceeds to determine whether the access code entered is consistent with the access code stored in the programmable memory (54). Upon the central processing unit (55) determining that the access code entered is acceptable, the transmitter (52) of the wireless key transmits a signal to the antenna (50) when the user pushes the "OPEN" button. The first central processing unit (51) receives a signal from the antenna (50) and subsequently disengages the locking mechanism (57) to allow access to the interior of the secure receptacle.

EXAMPLE 5

Another embodiment of the invention, as shown in FIG. 7, involves a receiving unit comprising an antenna (60), a programmable memory (61), and a central processing unit (62). The receiving unit is cooperatively positioned within a secure receptacle, with the central processing unit (61) communicatively connected to the antenna (60) and the programmable memory (62), and the antenna communicatively connected to a transmitter (63) of a wireless key via a wireless link (64). The wireless key comprises a transmitter (63) that transmits a plurality of unlocking signals in sequential order, with one unlocking signal being sent upon the pushing of one of the plurality of buttons (65) of the wireless key. The plurality of unlocking signals are received by the antenna (60) and processed by the central processing unit (61). If the sequence of unlocking signals transmitted by the wireless key is consistent with the access code stored in the programmable memory (62), the central processing unit (61) disengages the locking mechanism (66) of the secure receptacle, thereby allowing the user of the wireless key access to the interior of the receptacle.

EXAMPLE 6

The invention is further directed towards a process for the delivery of a retail good, the steps comprising the programming at least one programmable access code into a programmable memory (shown as 70 in FIG. 8); the ordering through a first telecommunications device by a user at least one retail good from a supplier (shown as 71 in FIG. 8); delivering at least one retail good by the supplier to a secure receptacle (shown as 72 in FIG. 8); the user entering a user access code into a wireless key (shown as 73 in FIG. 8), the wireless key being physically separate from the secure receptacle to avoid accessibility by unauthorized parties; processing the user access code entered into the wireless key (shown as 74 in FIG. 8); and disengaging a locking mechanism of the secure receptacle (shown as 75 in FIG. 8), thereby allowing the user to gain access to at least one retail good previously ordered and delivered.

EXAMPLE 7

In a further embodiment of the invention as shown in FIG. 9, a process for the delivery of a retail good employs two access codes, one that is entered through the use of a wireless key, the second which is entered through a keypad that is physically integrated with the secure receptacle. The process associated with the use of two access codes comprises the steps of programming at least one primary programmable access code into a first programmable memory that is integrated with the wireless key (shown as 80 in FIG. 9); programming at least one secondary programmable access code into a second programmable memory (shown as 81 in FIG. 9), the second programmable memory being integrated a keypad mounted to the secure receptacle; a user of a secure receptacle ordering at least one retail good from a supplier and the delivery of the order to the secure receptacle by the supplier's delivery carrier, entering a primary user access code by the user into a wireless key (shown as 82 in FIG. 9), the wireless key being physically separate from the secure receptacle; entering a secondary user access code by the user into a keypad (shown as 83 in FIG. 9), the keypad being physically integrated to the secure receptacle; processing the primary user access code entered into the wireless key and the secondary user access code entered into the keypad (shown as 84 in FIG. 9); and disengaging the locking mechanism of the secure receptacle (shown as 85 in FIG. 9), thereby allowing the user to gain access to at least one retail good previously ordered and delivered.

EXAMPLE 8

Figure 10:
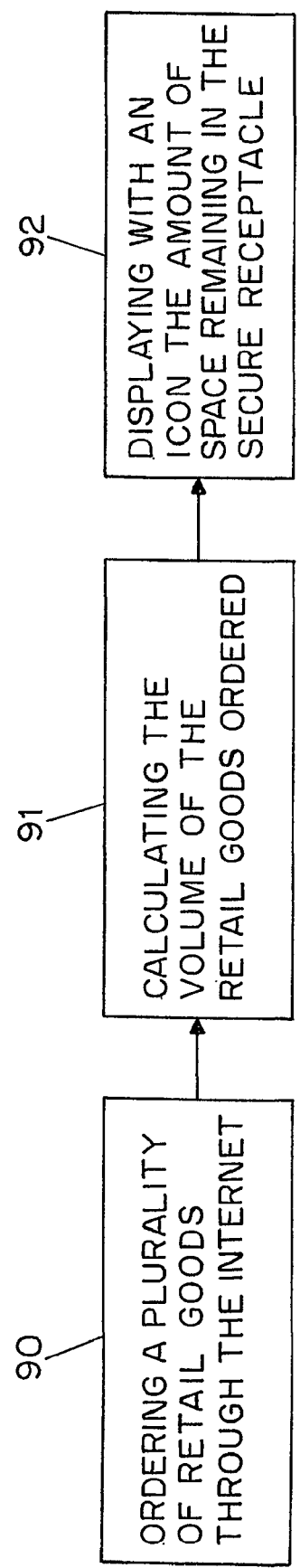
FIG. 10 shows the process associated in the use of an icon that informs a consumer about how much space is left in that consumer's secure receptacle as an order for retail goods is placed.

A further embodiment of the invention is directed towards a process to inform the consumer of how much space remains in his or her secure receptacle as more and more items are ordered. Of course, the secure or efficient delivery of items may be frustrated if too many items are ordered and they must either be left unattended by the secure receptacle or delivered at another time. Accordingly, when the consumer is placing an order through the Internet, an icon is presented which informs the consumer about the amount of space remains in his or her receptacle for the purchase of further retail goods. The process encompasses the ordering a plurality of retail goods through the Internet (shown as 90 in FIG. 10); providing a secure receptacle to the user with a predefined volume to which the plurality of retail goods will be delivered by a delivery carrier; calculating the percent volume a retail good ordered by the consumer will occupy in the secure receptacle when the retail good is placed in the secure receptacle by a delivery carrier (shown as 91 in FIG. 10); summing the percent volume for each retail good ordered by the user to obtain a total percent volume occupied by the plurality of retail goods; indicating the total percent volume to the user through the Internet while the user is ordering the plurality of retail goods (shown as 92 in FIG. 10); and resetting the total percent volume to zero after the user removes the plurality of retail goods from the secure receptacle.

EXAMPLE 9

In another embodiment of the invention, a first unlocking signal is sent by the wireless key via a cellular wireless network, in which the wireless key can be a cellular telephone or a RIM 902M Radio Modem that is manufactured by Research in Motion, Ltd. The buttons of such devices are used to input the access code known by a party having authorization to gain entry to the secure receptacle. Upon the input of the access code, the unlocking signal is transmitted via the cellular network to a central server. The central server processes the unlocking signal and sends a second unlocking signal to a modem that is found within the interior of the secure receptacle. The modem is coupled to a central processing unit, the central processing unit in turn being coupled to a programmable memory and a locking mechanism for the receptacle. Upon the modem receiving the second unlocking signal, the central processing unit coupled to the programmable memory determines whether the second unlocking signal is consistent with the access code stored within the programmable memory. If the second unlocking signal is consistent, the central processing unit disengages the locking mechanism of the receptacle, thereby allowing entry.

The wireless key in any of the embodiments of the invention possesses several means to discriminate against those who attempt to transmit an unlocking signal from the wireless key but are not authorized to do so. First, the wireless key is not attached to the secure receptacle and when not in use is stored in a location typically inaccessible to unauthorized users. Thus, the wireless key operates as a remote control and is only likely to be in the possession of only those parties who are authorized to gain access to the secure receptacle. Only under certain scenarios will an unauthorized party have possession of the wireless key, such as when the wireless key is lost or stolen.

Other embodiments of the wireless key also enhance security. In one embodiment of the invention, the wireless key possesses a plurality of buttons or means for entering data on the face of the wireless key. To gain access to the secure receptacle, an access code must be entered by depressing or pushing a combination of these buttons in a specific and predetermined sequence. The buttons may be labeled with alphanumeric indicia or color indicia.

For example, the wireless key may have ten buttons labeled with the numbers 0-9, respectively, with an access code consisting of a three-digit number which must be entered using the wireless key. Another example involves a wireless key possessing six buttons that uses color to distinguish between the different buttons, with the access code consisting of a color sequence, such as red-blue-red-yellow. Those skilled in the art will recognize that the use of alphanumeric and color indicia to create access restrictions will have many variations, both in the number of buttons possessed by the wireless key and the number of alphanumeric or color indicia that are used to create an access code.

The wireless key may employ other means which are capable of distinguishing an authorized user of the wireless key from an unauthorized user. As discussed above, knowledge of an access code distinguishes between authorized and non-authorized users. However, other criteria involving knowledge may be used, such as birth dates, maiden names, and social security numbers. In other embodiments, authorized and unauthorized users can also be distinguished by the use of physical characteristics of the authorized user. Examples of this method include voice printing and finger printing, wherein the wireless key possesses a means to distinguish the voice or finger print of an authorized user from an unauthorized user. A Breathalyzer can also be integrated into any of the above embodiments of the wireless key to ensure the sobriety of the authorized user.

In the embodiments in which knowledge-based criteria are used to distinguish authorized users from non-authorized users, an additional level of security is gained by the ability to alter such knowledge-based access codes. This allows an authorized party to change an access code to prevent others who once had knowledge of the previous access code from now gaining access to the receptacle.

In another embodiment of the invention, a wireless key is used in conjunction with a keypad that is physically integrated with the secure receptacle. An authorized user desiring access to the secure receptacle will enter a primary access code into the wireless key and a secondary access code into the keypad. The primary access code will be processed in accordance with the means previously disclosed, while the secondary access code will be processed with a central processing unit communicatively coupled to the keypad. Upon the processing of both the primary and secondary access codes, the locking mechanism of the secure receptacle is disengaged.

A knowledge-based access code may be altered by many means, and the method employed is dependent upon the embodiment of the invention. For example, if the wireless key directly transmits the unlocking signal directly to the wireless link that is contained within the interior of the receptacle as previously described, both the programmable memory of the wireless key and the programmable memory of the wireless link must be edited. The programmable memory of the wireless key can be programmed using a programming device, such as internally through the use of buttons contained on the wireless key. For example, depressing the "OPEN" and "0" button simultaneously will allow a new access code to be entered and stored within the programmable memory of the wireless key. The programmable memory of the wireless link can be similarly programmed using a keypad attached to the receptacle and coupled to the central processing unit.

The programming of at least one programmable access code into a programmable memory can be accomplished by several means. The user desiring to use a certain access code can access a web site to designate the desired access code. When the delivery carrier is delivering a retail good to the secure receptacle, the delivery carrier's wireless key downloads the desired programmable access code from the web site. The carrier's wireless key then transmits the desired access code via a low frequency signal to a wireless link physically integrated with the secure receptacle. The desired access code is subsequently uploaded to the programmable memory.

In a further embodiment of the invention, the programming of at least one programmable access code into a programmable memory can be accomplished through the use of the Internet. The user enters the desired access code through the use of a web site. The desired access code is downloaded to a modem from the web site through the Internet. The modem is physically integrated with the secure receptacle and communicatively coupled to the programmable memory. After downloading the desired access code from the web site, it is uploaded to the programmable memory.

The programming of at least one programmable access code into a programmable memory can further be accomplished through the use of a keypad physically integrated with the secure receptacle and communicatively coupled to the programmable memory. The user enters the code using the keys of the keypad and the desired code is uploaded to the programmable memory.

What is claimed is:

1. A process for ordering a plurality of retail goods, comprising the steps of: ordering the plurality of retail goods through a computer connected to the Internet by a user, providing a secure receptacle to the user with a predefined volume to which the plurality of retail goods will be delivered by a delivery carrier, calculating the percent volume a retail good ordered by the consumer wilt occupy in the secure receptacle when the retail good is placed in the secure receptacle by a delivery carrier, summing the percent volume for each retail good ordered by the user to obtain a total percent volume occupied by the plurality of retail goods, indicating the total percent volume to the user through the Internet while the user is ordering the plurality of retail goods, and resetting the total percent volume to zero after the user removes the plurality of retail goods from the secure receptacle.

2. The process of claim 1, wherein the total percent volume consists of summing the percent volume for each retail good ordered by the user in a plurality of orders by the user.

3. The process of claim 2, wherein the plurality of orders comprise orders from different suppliers.

4. The process of claim 2, wherein the plurality of orders comprise orders placed at different times by the user.

5. The process of claim 1, further comprising the steps of:
   delivering the retail goods ordered by the user to the secure receptacle; and
   receiving at a geographically distant central server a wireless key code from the user and unlocking the receptacle allowing user access to the receptacle; wherein the resetting step occurs after the user is allowed access to the receptacle.

6. The process of claim 5, wherein the total percent volume consists of summing the percent volume for each retail good ordered by the user in a plurality of orders by the user.

7. The process of claim 6, wherein the plurality of orders comprise orders from different suppliers.

8. The process of claim 6, wherein the plurality of orders comprise orders placed at different times by the user.

* * * * *

UNITED STATES PATENT AND TRADEMARK OFFICE
CERTIFICATE OF CORRECTION

PATENT NO. : 7,597,256 B2
APPLICATION NO. : 11/276506
DATED : October 6, 2009
INVENTOR(S) : John K. Stevens It is certified that error appears in the above-identified patent and that said Letters Patent is hereby corrected as shown below:

Column 8, Line 29, Claim 1 should read: "... ordered by the consumer will occupy in the secure receptable ..."

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO.       : 7,597,256 B2                                                   Page 1 of 1
APPLICATION NO. : 11/276506
DATED            : October 6, 2009
INVENTOR(S)      : John K. Stevens It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this

Twenty-eighth Day of September, 2010

David J. Kappos
*Director of the United States Patent and Trademark Office*